United States Patent Office 2,968,683
Patented Jan. 17, 1961

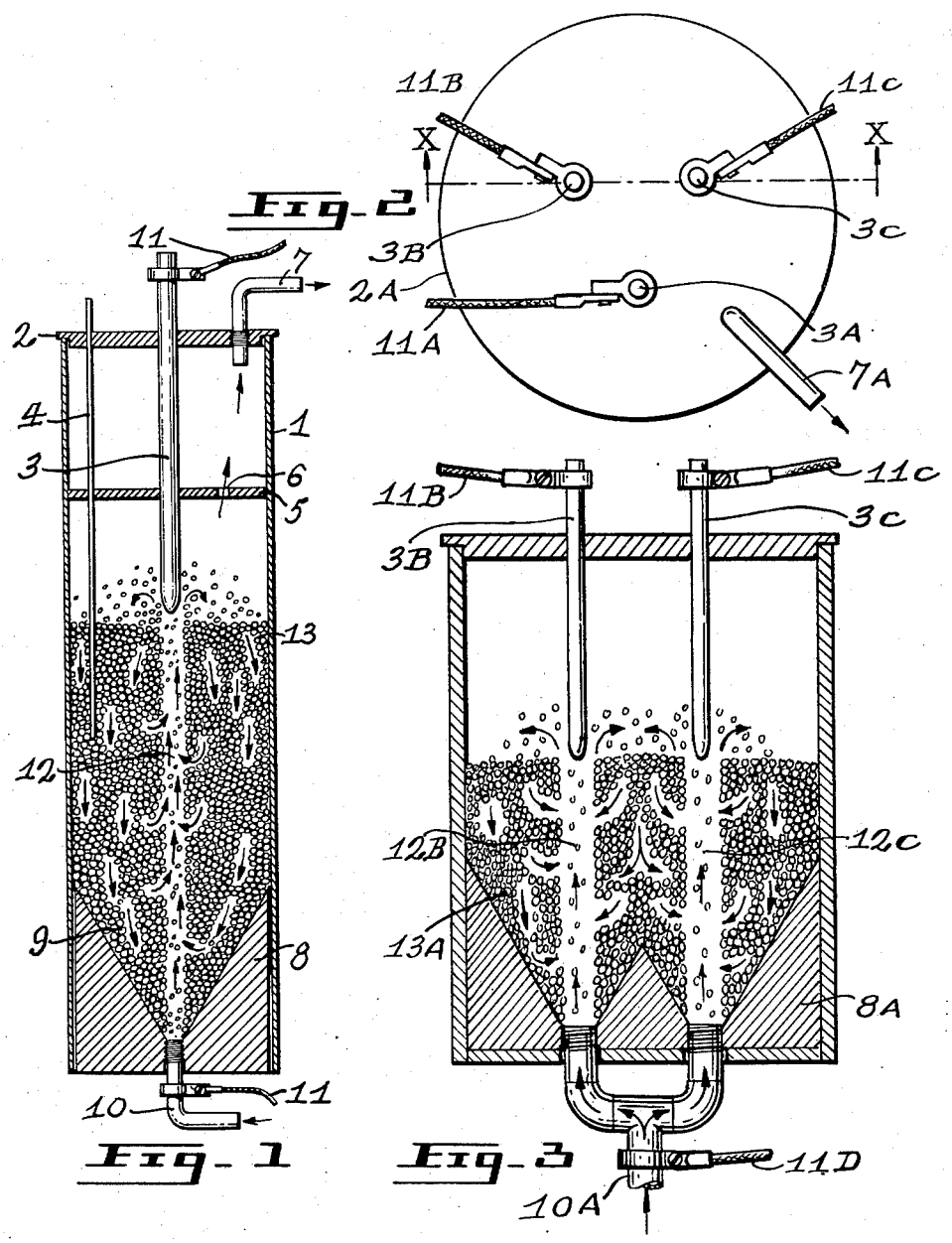

2,968,683

PROCESS FOR HEATING BEDS OF SOLID PARTICLES SPOUTED WITH GAS

Konrad H. Kossmann, Columbus, Ohio, assignor to Shawinigan Chemicals Limited, Montreal, Quebec, Canada, a corporation of Canada Filed Mar. 25, 1960, Ser. No. 17,557

12 Claims. (Cl. 260—683)

This invention relates to the electric heating of spouted beds by the passage of electricity through the particles which comprise the bed and to the carrying out of chemical reactions in the hot zone thus obtained.

The method of spouting beds of granular material too coarse to be fluidized is described in U.S. Patent 2,786,280, Gishler and Mathur.

The electric heating of fluidized beds of fine granular particles is described in U.S. Patent 1,857,799 to Winkler. This method is subject to certain limitations. In general it is not feasible to fluidize particles larger than 0.84 mm. (20 mesh) whereas it is quite feasible to spout particles up to 2.5 mm. Furthermore, for spouting these relatively large particles of a given material, it is quite feasible to use gas velocities of the order of ten times the gas velocity used for fluidizing the smaller particles of the same material. Thus the spouting technique is available for use where a reaction between a gas and a hot solid requires a shorter contact time than can be obtained in a fluidized bed.

Endothermic reactions at high temperatures in a spouted bed would involve difficult problems of heat transfer if it were necessary to pass the thermal energy through the walls of the reactor. It is an object of this invention to provide an effective and convenient method of providing thermal energy where it is required, i.e., in the bed itself.

According to the present invention, there is provided a process for heating a spouted bed of particulate solids, said bed including particles which are electrically conductive and the spouting fluid being a gas, said process comprising passing an electric current through the spouted bed between an electrode which makes contact with the dilute suspension of said particles in the spout of said bed and at least one other electrode which makes contact with the annular loosely packed moving body of particles surrounding the said spout.

The invention also includes a process which comprises (a) spouting a bed of granular solids with a gas, said bed including particles which are electrically conductive, (b) passing an electric current through the spouted bed between an electrode which makes contact with the dilute suspension of said granules in the spout of said bed and at least one other electrode which makes contact with the annular loosely packed moving body of said particles surrounding the said spout, said electric current having sufficient power to maintain the spouted bed at an elevated temperature, (c) simultaneously carrying out an endothermic chemical reaction at the elevated temperature in the said bed, and (d) recovering the products from the gases coming off the spouted bed.

It is already known in the art that, with beds of relatively large diameter, it is possible to have more than one spout operating at a time. The present invention can equally well be applied to spouted beds having multiple spouts, providing that there is a separate top electrode to make contact with the dilute suspension of particles in each spout of the bed. The invention thus further includes a process which comprises (a) spouting a bed of granular solids with a gas to form at least one spout, said bed including particles which are electrically conductive, (b) passing an electric current through the spouted bed between a single electrode for each spout, which electrode makes contact with the dilute suspension of said granules in said spout, and at least one other electrode which makes contact with the annular, loosely packed, moving body of particles surrounding said spouts, said electric current having sufficient power to maintain the spouted bed at an elevated temperature, (c) simultaneously carrying out a chemical reaction at the elevated temperature in said bed, and (d) recovering the products from the gases coming off the spouted bed.

Examples of chemical reactions which can be carried out in the spouted bed electrically heated in accordance with the invention include the formation of hydrocyanic acid by the reaction of ammonia with carbon or with hydrocarbons or with both simultaneously, the formation of carbon disulphide by the reaction of carbon (the carbon particles of the bed) with sulphur vapour or with hydrogen sulphide, the reduction of carbon dioxide to carbon monoxide, and the cracking of saturated hydrocarbons to olefins or acetylene or both. The invention is of special value for endothermic reactions requiring short contact times for optimum results but other endothermic reactions which require contact times of several seconds at moderate temperature may be effectively carried out at higher temperatures and shorter contact times, without the difficulties associated with the transmission of heat to the reaction through the reactor walls. The invention includes also the carrying out of exothermic reactions of low heat output where the overall heat requirements of the reaction vessel (i.e. the difference between the sensible heat of the outgoing and incoming gases plus the radiation, convection, and conduction losses from the reactor) are more than the exothermic heat of reaction, so that additional heat energy must be provided.

The invention is illustrated in the accompanying drawings in which Figure 1 is a vertical section of an apparatus in operation with a single spout, Figure 2 is a top review of an apparatus showing the relative location of three top electrodes for a bed with three spouts, and Figure 3 is a vertical section on the line X—X of Figure 2, showing more than one spout in operation.

Figure 1 shows a cylinder 1 closed at the top by a cover 2, through which pass an electrode 3 and a thermocouple well 4. The electrode and well also pass through a disc 5 which serves to assist in holding them in position. An opening 6 in disc 5 and a gas outlet tube 7 in cover 2 permit the passage of gas from the space below. The bottom of the cylinder is closed by the electrode 8 which is a cylinder in which are formed an inverted conical space 9 and a bottom opening into which is secured, mechanically and electrically, an inlet 10 for the gas used for spouting the bed. Electrical connections 11 are provided on the electrode 3 and the gas inlet 10 which in turn connects with electrode 8. The spout, consisting of a dilute suspension of granular solids, is indicated at 12 and the annulus of loosely packed solids at 13.

Figure 2 shows a similar cylindrical apparatus to that shown in Figure 1, but with three symetrically spaced spouts and top electrodes therein. The electrodes are 3A, 3B, and 3C respectively, penetrating the top 2A of the apparatus. Electrical leads 11A, 11B, and 11C connect the electrodes to a common pole (not shown) of a source of electrical power. 7A is the gas outlet tube.

Figure 3 shows a vertical section of the apparatus of Figure 2 on the line X—X. The electrodes 3B and 3C are positioned in the spouts 12B and 12C. Gas inlet 10A feeds gas to spouts 12B, 12C, and 12A (not shown).

Electrical connection 11D completes the electrical circuit to the other pole (not shown) of the source of power, from the electrode 8A which is symetrically positioned in the bottom of the loosely packed solids 13A.

The percentage of voids in a spout is very high even at its upper extremity, ranging from 60% to 95% in typical cases. It is therefore quite unexpected that an electrode immersed in a zone with this low density of solids would condut electricity to the moving annulus and to the other electrode.

It is a critical feature of this invention that one and only one electrode be located in each spout of a spouted bed. It is also highly desirable that the electrical circuit from the electrode, through the spout and moving annulus of particles surrounding the spout, be completed through a second electrode or connection providing minimum interference with the symmetrical movement of particles in the moving annulus. It is substantially impossible to obtain the desired even flow of solids, even current distribution, and uniform heating if more than one electrode is placed in a spout, or if no electrode is located in the spout so that the current does not pass through the spout. In preferred embodiments, with one electrode located in the spout, the electrical circuit from the spout through the moving annulus is completed by an electrode or connection which is spatially symmetrical relative to the axis of the spout and moving annulus. With this arrangement, there is minimum interference with symmetrical flow of particles in the annulus. This is readily achieved, for example, by the arrangement shown in the drawing; other annular-shaped electrodes are also substantially as satisfactory.

The invention is illustrated by the following examples:

EXAMPLE 1

Heating of spouted bed

A quantity of "Esso" fluid petroleum coke made at Billings, Montana, was calcined by heating in a thin layer for a few minutes at about 700° C. in a current of air. 600 grams of the fraction of this calcined petroleum coke through 8 on 16 mesh (1.0 to 2.4 mm.) was charged into a reactor of the type indicated in Figure 1 and having a diameter of 3 inches and an inlet diameter of 3.5 mm.; this provided a bed depth of about 7 inches. The bed was spouted with air at the rate of 2.6 cubic feet per minute measured at 20° C. and atmospheric pressure (hereinafter designated s.c.f.m.) while A.C. power was applied to the terminals at 75 volts and 7 amperes. The top electrode was a graphite rod of ½ inch diameter immersed in the spout of particles so that the bottom of the electrode was below the top of the moving annulus, giving a total immersion in the spout of about 2 inches. After 10 minutes the temperature had levelled off at 320° C. as measured in the annulus; by manipulating the assembly of the electrode 3, the thermocouple well 4 and discs 2 and 5, the thermocouple well was moved temporarily into the spout where the temperature was found to be 330° C.

By applying power at 115 volts and 16 amperes with an air flow of 2.24 s.c.f.m., it was found that the temperature in the annulus levelled off at about 740° C. while that in the spout was about 755° C. Since combustion of the coke occurred under these conditions, it is undoubtedly true that a bed spouted with nitrogen at this power input would not attain this temperature.

The top electrode, having a friction fit in the cover and disc, could be raised or lowered to give a variable immersion in the spout. With increased immersion the electrical resistance of the bed was found to be decreased.

EXAMPLE 2

Preparation of olefins by cracking

The reactor of Example 1 was charged with 400 g. of the same stock of calcined petroleum coke of the same size as used in Example 1, which provided a bed depth of about 5½ inches. The coke was spouted with nitrogen while A.C. power was applied to the terminals at 220 volts and 30 amperes. When the temperature of the bed reached 850° C., the nitrogen was replaced by a commercial gas mixture of the following composition by volume:

| | Percent |
|---|---|
| Propane | 54.0 |
| Propylene | 37.2 |
| Ethane | 5.1 |
| Methane | 3.7 |
| | 100 | which was fed to the reactor at the rate of 1.3 s.c.f.m. After five minutes' operation with this gas, a sample was taken of the off-gas which amounted to 2.0 s.c.f.m. Analysis by gas-chromatography showed its composition by volume to be:

| | Percent |
|---|---|
| Propane | 22.6 |
| Propylene | 19.2 |
| Ethane | 3.4 |
| Methane | 5.2 |
| Ethylene | 14.3 |
| Hydrogen | 35.1 |
| Nitrogen | 0.2 |
| | 100 |

Calculation shows that 30% of the $C_3$ hydrocarbons fed were converted (i.e. 70% of the original appeared in the off-gas); the yield of ethylene was 53% by weight based on $C_3$ hydrocarbons converted, or 16% by weight on those fed to the reactor. The calculted contact time was 0.10 second based on the average of the input and output gas valumes corrected for actual temperatures, the depth and area of the coke bed, and assuming 50% voids in the bed.

EXAMPLE 3

Preparation of olefins by cracking

The reactor of Example 1 was charged with 250 grams, instead of 400 grams as in Example 2, of the same size of calcined petroleum coke of the same size as used in Example 1 giving a bed depth of about 4 inches. The coke was spouted with nitrogen while A.C. power was applied at 220 volts and 25 amperes. When the temperature of the bed reached 1050° C., the nitrogen was replaced by the same gas mixture as used in Example 2 at a flow rate of 0.87 s.c.f.m. With the smaller charge and the lower gas rate, the temperature was maintained at 1050° C. with this current although 30 amperes were required for the lower temperature in Example 2. After five minutes' operation with this gas, a sample was taken of the off-gas which amounted to 1.73 s.c.f.m. Analysis by gas-chromatography showed its composition to be:

| | Percent |
|---|---|
| Propane | 3.7 |
| Propylene | 3.5 |
| Ethane | 1.9 |
| Methane | 29.7 |
| Ethylene | 19.4 |
| Hydrogen | 41.8 |
| | 100 |

Calculation shows that 84% of the $C_3$ hydrocarbons fed were converted; the yield of ethylene was 32.6% by weight based on $C_3$ hydrocarbons converted, or 27.5% by weight on those fed to the reactor. The contact time was 0.08 second.

EXAMPLE 4

Example 2 was repeated with the substitution of substantially pure butane gas for the gas mixture of Example 2, and with the use of 25 amperes instead of 30 amperes. The nitrogen was replaced by butane when the temperature reached 950° C. and was continued at a rate of about 1.1 s.c.f.m. while the temperature gradually fell during five minutes to 850° C. at which time the off-gas amounted to a calculated value of 2.75 s.c.f.m.; a sample analyzed by gas chromatography showed:

|  | Percent |
| --- | --- |
| Butane | 10.0 |
| Propylene | 9.4 |
| Ethane | 3.4 |
| Ethylene | 22.8 |
| Methane | 26.1 |
| Hydrogen | 11.5 |
| Nitrogen | 16.8 |
|  | 100 |

Calculation shows that 75% of the butane was converted; the yields of propylene and ethylene were 22.8% and 36.6%, respectively, based on the butane converted, and 17.1% and 27.4%, respectively, based by weight on the butane fed. The contact time was 0.09 second.

The characteristics of the granular solids which may be spouted are set forth in U.S. Patent 2,786,280 previously noted. For utility in the present invention the solids, or at least some significant portion of them, must be electrically conductive to the extent that at the voltage available on the power circuit sufficient current can be passed through the bed to bring it to the desired temperature. Various forms of carbon when in the appropriate size range, for example sized metallurgical coke, can be used in the present invention. Petroleum coke as it usually comes on the market has very low conductivity and requires calcination to give it appropriate conductivity. Particularly convenient are coke particles of appropriate size screened from coke produced by the fluid coking process. The method of calcination is not critical; for example the coke may be heated while exposed to air for a few seconds up to an hour or more at temperatures ranging from 700° C. to 900° C., the shorter times being effective for a shallow layer in a current of air at higher temperatures, and a longer time being required at lower temperatures in dormant air.

The electrode in contact with the moving annulus of particles may be of any convenient form. For example it may be as shown in the drawing or it may be of annular shape forming part of the wall of the chamber. A.C. or D.C. power may be used, the former being preferred for convenient control.

Usually a spouted bed is operated with only one spout, which requires only one top electrode. Spouted beds with multiple spouts and corresponding numbers of top electrodes are feasible provided that individual control is exercised over the gas supply to the individual spouts. However, spouted beds with single spouts are simpler to operate and control, and therefore are preferred and most commonly used, but the present invention is not restricted to use in conjunction with single spout beds. Numerous other modifications may be made in the specific expedients described without department from the invention set out in the following claims. This application is a continuation-in-part of my earlier application S.N. 694,556, filed November 5, 1957.

What is claimed is:

1. A process which comprises (a) spouting a bed of granular solids with a gas, said bed including particles which are electrically conductive, (b) passing an electric current through the spouted bed between a single central electrode which makes contact with the dilute suspension of said granules in the spout of said bed and at least one other electrode which makes contact with the annular loosely packed moving body of particles surrounding the said spout, said electric current having sufficient power to maintain the spouted bed at an elevated temperature, (c) simultaneously carrying out a chemical reaction at the elevated temperature in the said bed and (d) recovering the products from the gases coming off the spouted bed.

2. A process as claimed in claim 1 wherein the conductive particles are coke.

3. A process as claimed in claim 1 wherein the conductive particles are petroleum coke made by a fluid coking process.

4. A process for preparing olefins from a hydrocarbon gas which process comprises directing a jet of the said gas up through a bed of conductive granular carbon to form a spouted bed, passing an electric current through the spouted bed between a single central electrode which makes contact with the dilute suspension of said granules in the spout of said bed and at least one other electrode which makes contact with the annular loosely packed moving body of particles surrounding the said spout, said electric current having sufficient power to maintain the spouted bed at an elevated temperature sufficient to crack the said hydrocarbon gases to olefins, and recovering olefins from the effluent gases.

5. A process as claimed in claim 4 wherein the conductive carbon particles are coke.

6. A process as claimed in claim 4 wherein the conductive carbon particles are petroleum coke made by a fluid coking process.

7. A process according to claim 1 wherein the conductive particles are petroleum coke made by a fluid coking process and the percentage of voids in the spout ranges from 60 to 95%.

8. A process according to claim 1 wherein the percentage of voids in the spout ranges from 60 to 95%.

9. A process according to claim 4 wherein the conductive particles are petroleum coke made by a fluid coking process and the percentage of voids in the spout ranges from 60 to 95%.

10. A process according to claim 1 wherein said other electrode is spatially symmetrical relative to the axis of the spout and the moving annulus.

11. A process which comprises (a) spouting a bed of granular solids with a gas to form at least one spout, said bed including particles which are electrically conductive, (b) passing an electric current through the spouted bed between a single central electrode for each spout, which electrode makes contact with the dilute suspension of said granules in said spout of said bed and at least one other electrode which makes contact with the annular, loosely packed, moving body of particles surrounding said spouts, said electric current having sufficient power to maintain the spouted bed at an elevated temperature, (c) simultaneously carrying out a chemical reaction at the elevated temperature in the said bed, and (d) recovering the products from the gases coming off the spouted bed.

12. A process according to claim 11 wherein there are a plurality of spouts in said spouted bed and each of said spouts has a single control electrode which makes contact with the dilute suspension of the granules in the spout.

References Cited in the file of this patent

UNITED STATES PATENTS

| 1,400,959 | Koetschet | Dec. 20, 1921 |
| 1,857,799 | Winkler | May 10, 1932 |
| 1,980,380 | Burk et al. | Nov. 13, 1934 |
| 2,786,280 | Gishler et al. | Mar. 26, 1957 |
| 2,799,640 | Pevere et al. | July 16, 1957 |

UNITED STATES PATENT OFFICE
CERTIFICATE OF CORRECTION

Patent No. 2,968,683                      January 17, 1961

Konrad H. Kossmann

It is hereby certified that error appears in the above numbered patent requiring correction and that the said Letters Patent should read as corrected below.

Column 2, line 64, for "penertating" read -- penetrating --; column 4, line 37, for "valumes" read -- volumes --; column 6, line 61, for "control" read -- central --.

Signed and sealed this 3rd day of October 1961.

(SEAL)
Attest:

ERNEST W. SWIDER
Attesting Officer

DAVID L. LADD
Commissioner of Patents
USCOMM-DC